(12) United States Patent
Pajukoski et al.

(10) Patent No.: US 8,576,823 B2
(45) Date of Patent: *Nov. 5, 2013

(54) GENERATING PILOT SEQUENCE FOR REFERENCE SIGNAL

(75) Inventors: Kari Pajukoski, Oulu (FI); Esa Tiirola, Kempele (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/268,088

(22) Filed: Oct. 7, 2011

(65) Prior Publication Data

US 2012/0026967 A1  Feb. 2, 2012

Related U.S. Application Data

(63) Continuation of application No. 11/726,877, filed on Mar. 23, 2007, now Pat. No. 8,036,197.

(30) Foreign Application Priority Data

Oct. 3, 2006 (GB) .................................... 0619530.9

(51) Int. Cl.
*H04B 7/216* (2006.01)

(52) U.S. Cl.
USPC ........... 370/342; 370/329; 370/335; 370/468; 455/446; 455/447

(58) Field of Classification Search
USPC ......... 370/329–330, 335, 203, 252, 342, 344, 370/468; 455/422.1–425, 446–447
See application file for complete search history.

(56) References Cited

U.S. PATENT DOCUMENTS

| 5,926,500 | A | 7/1999 | Odenwalder | 375/200 |
|---|---|---|---|---|
| 6,044,067 | A * | 3/2000 | Suzuki | 370/252 |
| 7,457,230 | B2 | 11/2008 | Ohkubo et al. | 370/208 |
| 7,606,193 | B2 * | 10/2009 | McFarland et al. | 370/329 |
| 7,701,919 | B2 | 4/2010 | Ah Lee | 370/344 |
| 7,715,845 | B2 * | 5/2010 | Jin et al. | 455/447 |
| 8,036,166 | B2 * | 10/2011 | Tiirola et al. | 370/329 |
| 8,351,392 | B2 * | 1/2013 | Ahn et al. | 370/329 |
| 2003/0006796 | A1 | 1/2003 | Stark | 375/130 |
| 2003/0067961 | A1 | 4/2003 | Hudson et al. | 375/130 |
| 2004/0066802 | A1 | 4/2004 | Ro et al. | 370/528 |
| 2004/0131007 | A1 | 7/2004 | Smee et al. | 370/208 |
| 2005/0111492 | A1 | 5/2005 | Kang et al. | 370/480 |
| 2006/0050799 | A1 | 3/2006 | Hou et al. | 375/260 |

(Continued)

FOREIGN PATENT DOCUMENTS

| WO | WO 98/04973 | 2/1998 |
|---|---|---|
| WO | WO 02/33911 A1 | 4/2002 |

(Continued)

OTHER PUBLICATIONS

Mottier, et al., "Spreading Sequence Assignment in the Downlink of OFCDM Systems Using Multiple Transmit Antennas", (5 pages).

(Continued)

*Primary Examiner* — Sharad Rampuria
(74) *Attorney, Agent, or Firm* — Harrington & Smith

(57) ABSTRACT

A network element may provide a plurality of user equipments with a dedicated pilot sequence for uplink reference signal transmission. A user equipment may, after receipt of a dedicated pilot sequence, spread the pilot sequences using a block spreading method.

27 Claims, 3 Drawing Sheets

(56) References Cited

U.S. PATENT DOCUMENTS

| | | | |
|---|---|---|---|
| 2006/0209732 A1 | 9/2006 | Gorokhov et al. | 370/310 |
| 2006/0215603 A1 | 9/2006 | Nishio et al. | 370/329 |
| 2006/0245472 A1 | 11/2006 | Pan et al. | 375/144 |
| 2006/0264220 A1 | 11/2006 | Chen et al. | 455/454 |
| 2006/0274842 A1 | 12/2006 | Pan et al. | 375/260 |
| 2006/0291431 A1 | 12/2006 | Pajukoski et al. | 370/335 |
| 2007/0004465 A1* | 1/2007 | Papasakellariou et al. | 455/571 |
| 2007/0058595 A1 | 3/2007 | Classon et al. | 370/337 |
| 2007/0097927 A1 | 5/2007 | Gorokhov et al. | 370/335 |
| 2007/0097942 A1 | 5/2007 | Gorokhov et al. | 370/342 |
| 2007/0165588 A1 | 7/2007 | McCoy | 370/344 |
| 2007/0171995 A1* | 7/2007 | Muharemovic et al. | 375/260 |
| 2007/0183386 A1 | 8/2007 | Muharemovic et al. | 370/344 |
| 2007/0189404 A1 | 8/2007 | Baum et al. | 375/260 |
| 2007/0195906 A1 | 8/2007 | Kim et al. | 375/267 |
| 2007/0253465 A1 | 11/2007 | Muharemovic et al. | 375/130 |
| 2007/0263529 A1 | 11/2007 | Ishikura et al. | 370/211 |
| 2008/0049708 A1 | 2/2008 | Khan et al. | 370/343 |
| 2008/0101441 A1 | 5/2008 | Palanki et al. | 375/146 |
| 2008/0123616 A1* | 5/2008 | Lee | 370/344 |
| 2009/0149187 A1 | 6/2009 | Miki et al. | 455/450 |
| 2009/0227261 A1 | 9/2009 | Tiirola et al. | 455/450 |
| 2009/0279527 A1 | 11/2009 | Fukuoka et al. | 370/342 |
| 2009/0296563 A1 | 12/2009 | Kishiyama et al. | 370/210 |
| 2010/0002655 A1* | 1/2010 | Ofuji et al. | 370/335 |
| 2010/0002800 A1* | 1/2010 | Kim et al. | 375/295 |
| 2010/0046480 A1* | 2/2010 | Kawamura et al. | 370/335 |
| 2013/0129018 A1* | 5/2013 | Ko et al. | 375/296 |

FOREIGN PATENT DOCUMENTS

| | | |
|---|---|---|
| WO | WO 02/071770 A1 | 9/2002 |
| WO | WO-2007/084840 A2 | 7/2007 |
| WO | WO-2007/149290 A2 | 12/2007 |
| WO | WO-2008/035955 A2 | 3/2008 |

OTHER PUBLICATIONS

Ren, Guangliang; Change, Yilin; Zhang, Hui; Zhang, Huining, "Synchronization method based on a new constant envelop preamble for OFDM systems," IEEE Transactions on Broadcasting, vol. 51, No. 1, Mar. 2005, pp. 139-143.

"R1-060925: Comparison of Proposed Uplink Pilot Structures for SC-OFDMA", 3GPP T.

"On Allocation of Uplink Pilot Sub-Channels in EURA SC-FDMA", 3GPP TSG RAN WG1 Ad Hoc on LTE, R1-050822, Aug.-Sep. 2005, 7 pgs.

"Cubic Metric properties of CAZAC sequences", 3GPP TSG RAN WG1#45, R1-061284, May 2006, 4 pgs.

"Coherent vs. non-coherent ACK/NAK signaling in E-UTRA uplink", 3GPP TSG RAN WG! Meeting #48, R1-070749, Feb. 2007, 7 pgs.

3GPP TR 25,814, V.7.0.0 (Jun. 2006), $3^{rd}$ Generation Partnership Project; Technical Specification Group Radio Access Network; Physical layer aspects for evolved Universal Terrestrial Radio Access (UTRA) (Release 7), pp. 67-78.

TSG-RAN WG1; R1-080510; "Multiplexing of ACK/NACK and Scheduling Request on PUCCH", Ericsson; Sevilla, Spain; Jan. 14-28, 2008.

3GPP TSG RAN WG1 #42 on LTE; R1-050851; "Orthogonal Pilot Channel in the Same Node B in Evolved UTRA Uplink", NTT DoCoMo, NEC, Sharp; London, UK; Aug. 29-Sep. 2, 2005.

Xiaoming Peng et al.; "A Simplified Transceiver Structure for Cyclic Extended CDMA System with Frequency Domain Equalization", IEEE; Sep. 2005.

Guangliang Ren et al.; "Synchronization Method Based on a New Constant Envelop Preamble for OFDM Systems", IEEE Transactions On Broadcasting, vol. 51, No. 1, Mar. 2005; pp. 139-143.

Liru Le et al; "Extended Orthogonal Polyphase Codes for Multicarrier CDMA System", IEEE Communications Letters, vol. 8, No. 12, Dec. 2004; pp. 700-702.

Chang, Y et al., "Synchronization Method Based on a New Constant Envelop Preamble for OFDM Systems", IEEE Transactions on Broadcasting, IEEE Service Center, Piscataway, NJ, US, vol. 51, No. 1, Mar. 2005, sections III and IV.

Dubey, V K et al., "Extended Orthogonal Polyphase Codes for Multicarrier CDMA System", IEEE Communications Letters, IEEE Service Center, Piscataway, NJ, US, vol. 8, No. 12, Dec. 2004, pp. 700-702, sections I, II, and V.

3GPP TR 25.814, V7.0.0 (Jun. 2006), $3^{rd}$ Generation Partnership Project; Technical Specification Group Radio Access.Network; Physical layer aspects for evolved Universal Terrestrial Radio Access (UTRA) (Release 7), pp. 67-78.

TSG-RAN WG1 LTE AdHoc, R1-061862, Ericsson, "Uplink Non-data-associated Control Signalling", Cannes, France, Jun. 27-30, 2006, 3 pgs.

3GPP TSG RAN1 #46, R1-062065, Motorola, "L1/L2 Uplink Control Mapping & Numerology", Tallinn, Estonia, Aug. 28-Sep. 1, 2006, 5 pgs.

3GPP TSG RAN WG1 LTE Ad Hoc, R1-061674, NTT DoCoMo, Fujitsu, NEC, Sharp, Toshiba Corp., "Single-Carrier Based Multiplexing of Uplink L1/L2 Control Channel", Cannes, France, Jun. 27-30, 2006, 9 pgs.

3GPP TSG RAN WG1 LTD Ad Hoc, R1-061675, NTT DoCoMo, Sharp, Toshiba Corp., "Data-non-associated L1/L2 Control Channel Structure for E-UTRA Uplink", Cannes, France, Jun. 27-30, 2006, 6 pgs.

3GPP RAN1 LTE Ad Hoc, R1-061699, "Uplink ACK/NACK signaling: FDM vs. TDM", Cannes, France, Jun. 27-30, 2006, 9 pgs.

3GPP TS RAN WG1 LTE Ad Hoc, R1-061779, "Multiplexing of Control Signalling in E-UTRA Uplink", Cannes, France, Jun. 27-30, 2006, 5 pgs.

3GPP TSG RAN1 LTE Ad Hoc, R1-061802, "Multiplexing and Link Analysis of CQI Channel in UL", Cannes, France, Jun. 27-30, 2006, 6 pgs.

3GPP TSG RAN WG1#44bis, R1-060925: Comparison of Proposed Uplink Pilot Structures for SC-OFDMA, Agenda Item: 10.2.1, Athens, Greece, Mar. 27-31, 2006.

WAVECOM; "Different pilots shape distribution for OFDM blocks"; 3GPP TSG-RAN-1 Meeting #33, R1-030679; Aug. 25-29, 2003; New York, USA.

Huawei; "Pilot structure of SC-FDMA in Evolved UTRA uplink"; 3GPP TSG RAN WG1 Meeting #43, R1-051432; Nov. 7-11, 2005; Seoul, Korea.

* cited by examiner

GENERATING PILOT SEQUENCE FOR REFERENCE SIGNAL

CROSS REFERENCE TO RELATED APPLICATION

This application is a continuation of U.S. Pat. No. 8,036, 197 (filed Mar. 23, 2007 as U.S. patent application Ser. No. 11/726,877; and issued on Oct. 11, 2011) and claims benefit thereof under 35 U.S.C. §120; and through that application Ser. No. 11/726,877 also claims priority to UK Patent Application Serial No., GB 0619530.9, filed Oct. 3, 2006. That priority UK application GB 0619530.9 is hereby incorporated by reference.

FIELD OF THE INVENTION

The invention relates to signalling in a communication system, and in particular, but not exclusively, to uplink reference signal sequences.

BACKGROUND

Communication networks typically operate in accordance with a given standard or specification which sets out what the various elements of the network are permitted to do and how that should be achieved. For example, the standard may define whether the user or more precisely, user equipment is provided with a circuit switched service or a packet switched service. The standard may also define the communication protocols which shall be used for the connection. The given standard also defines one or more of the required connection parameters. The connection parameters may relate to various features of the connection. The parameters may define features such as the maximum number of traffic channels, quality of service and so on. Features that relate to multi-slot transmission may also be defined.

In other words, the standard defines the "rules" and parameters on which the communication within the communication system can be based. Examples of the different standards and/or specifications include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or CDMA in UMTS (Code Division Multiple Access in Universal Mobile Telecommunications System) and so on.

The user equipment i.e. a terminal that is to be used for communication over a particular communication network has to be implemented in accordance with the predefined "rules" of the network. A terminal may also be arranged to be compatible with more than one standard or specification, i.e. the terminal may communicate in accordance with several different types of communication services. These user equipment are often called multi-mode terminals, the basic example thereof being a dual-mode mobile station.

A communication network is a cellular radio network consisting of cells. In most cases the cell can be defined as a certain area covered by one or several base transceiver stations (BTS) serving user equipment (UE), such as mobile stations (MS), via a radio interface and possibly connected to a base station subsystem (BSS). Several cells cover a larger area, and form typically a radio coverage area referred to as a location area (LA) or in some standards as a routing area (RA). It should be appreciated that the size of the location area or routing area depends on the system and circumstances, and may equal to one cell or be even smaller, such a part of a coverage area of a base station. A feature of the cellular system is that it provides mobility for the mobile stations, i.e. the mobile stations are enabled to move from a location area to another, and even from a network to another network that is compatible with the standard the mobile station is adapted to.

The user equipment (UE) within one of the cells of the cellular system can be controlled by a node providing controller function. Examples of the controller nodes include a base station controller (BSC) and a radio network controller (RNC). The controller can be connected further to a gateway or linking node, for example a gateway GPRS support node (GGSN) or gateway mobile switching center (GMSC), linking the controller nodes to other parts of the communication system and/or to other communication networks, such as to a PSTN (Public Switched Telecommunications Network) or to a data network, such as to a X. 25 based network or to a TCP/IP (Transmission Control Protocol/Internet Protocol) based network. The network may also include nodes for storing information of mobile stations subscribing the networks or visiting the networks, such as appropriate home location registers (HLR), visitor location registers (VLR) and home subscriber servers (HSS).

A proposal for the developed communication systems comprises a third generation partnership project (3GPP) long term evolution (LTE) packet-switched only access scheme. In a proposed 3GPP long term evolution (LTE) access scheme, a flat architecture is provided by an evolved Node B (eNB) and an access Gateway (aGW) that are involved in controller functions. 3GPP is also performing a feasibility study associated with streamlining the 3GPP packet switched network architecture to be used for the access.

In the uplink (UL) part of a such communications system, reference signal sequences are transmitted between a user equipment (UE) and a network element or node. However, a problem still to be adequately addressed is how to enable reference signal transmission with sufficient orthogonality between the reference signals of multiple user equipments in a certain cell or in multiple cells. In particular, there is a need to improve the pilot signal's resistivity against intra- or inter-cell interference.

BRIEF SUMMARY

Embodiments of the invention aim to address one or more of the above problems. In particular, embodiments of the invention aim to provide enhanced orthogonality between the reference signals of multiple user equipments.

According to one embodiment, a plurality of user equipments is provided with a dedicated pilot sequence for uplink reference signal transmission.

A user equipment may, after receipt of a dedicated pilot sequence, spread the pilot sequences using a block spreading method.

According to another embodiment, an apparatus at a network includes a pilot sequence generator for generating a dedicated pilot sequence for uplink reference signal transmission for each of a plurality of user equipments. A sequence spreader in a user equipment may then spread the pilot sequences using a block spreading method.

According to another embodiment, an apparatus includes a pilot sequence generating means for generating a dedicated pilot sequence for uplink reference signal transmission for each of a plurality of user equipments. A user equipment may comprise a sequence spreading means for spreading the pilot sequences using a block spreading method.

According to another embodiment, a communication system includes a network element and a plurality of user equipments, wherein the network element is configured to perform a channel estimation operation based on time averaging, wherein an averaging length of a channel estimation filter is sized according to length of block-level code.

According to another embodiment, a communication system includes a network element and a plurality of user equipments wherein the network element is configured to perform a despreading operation combined with a channel estimation operation.

According to another embodiment, a computer program product includes a set of instructions which when executed by a processor in a network element of a communications system, causes the network element to provide each of a plurality of user equipments with a dedicated pilot sequence for uplink reference signal transmission.

According to yet another embodiment, a computer program product includes a set of instructions which when executed by a processor in a communication device, causes the communication device to spread pilot sequences using a block spreading method based on a dedicated pilot sequence for uplink reference signal transmission as received from a network element.

In one embodiment, the pilot sequences are spread using orthogonal codes, for example Hadamard codes. Each dedicated pilot sequence may comprise a Constant Amplitude Zero AutoCorrelation (CAZAC) sequence, and each CAZAC sequence may have a dedicated frequency pin allocation and/ or a defined cyclic shift of a single CAZAC code. In another embodiment, the dedicated pilot sequences may comprise multiple CAZAC codes.

In another embodiment, an uplink transmission interval in the method consists of two sub-frames. The method may be performed in a Universal Mobile Telecommunications System Terrestrial Radio Access Network long term evolution (UTRAN LTE) network.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

The invention will now be further described by way of example only, with reference to the following specific embodiments.

In the 3GPP long term evolution (LTE) system, intra-cell interference related to the pilot signals exists when reference signals from multiple user equipments (UEs) share the same frequency and time resource. This may happen, for example, with channel dependent scheduling and virtual MIMO (multiple input multiple output). Also the smallest bit rates like data-non-associated control, including the reference signals, are multiplexed into the same frequency and time resource.

With respect to the inter-cell interference of reference signals, in order to minimize the cross-correlation properties of the Constant Amplitude Zero AutoCorrelation (CAZAC) codes, different CAZAC sequences should be used in different cells. The number of CAZAC sequences is basically decided by the length of the sequence. The number of CAZAC sequences is the number of integers relatively prime to the sequence length. Assuming that the uplink resource allocation consists of only one physical resource block (PRB), the length of a short block (SB) in an uplink sub-frame is only 6 symbols. This means that the number of CAZAC sequences with SB of one PRB is equal to only four. As mentioned, in order to minimize the cross-correlation properties of the CAZAC codes, different CAZAC sequences should be used in different cells. However, when the number of CAZAC sequences is small, the re-use planning of the sequences becomes very difficult. This also indicates that there is a need for improving the orthogonality between different cells.

Figure 1:
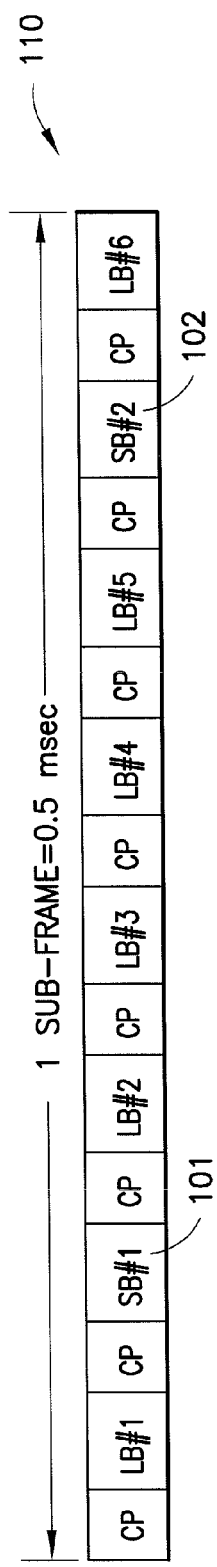
FIG. 1 illustrates format of a subframe for uplink in accordance with 3GPP LTE which may use embodiments to advantage.

FIG. 1 shows one sub-frame 110 in a format for 3GPP LTE UL. There are two blocks reserved for pilot signal in the current frame format (3GPP LTE UL) as can be seen in FIG. 1. The blocks reserved for the pilot signal are designated as SB1 101 and SB2 102. Other blocks of the subframe 110 include long blocks LBs and cyclic prefixes CPs.

In 3GPP LTE, the uplink TTI (Transmission Interval) consists of two consecutive sub-frames 110. Thus, the pilot resource actually consists of four short blocks (SBs). The CAZAC sequence has been agreed to be a pilot sequence for 3GPP LTE UL. CAZAC sequences can be defined by the equation:

$$a_u(k) = \exp\left(-j2\pi u \frac{k^2}{N_G}\right)$$

where k is the sample index and $N_G$ is length of CAZAC sequence.

Both the code division multiplexing (CDM) and frequency division multiplexing (FDM) types of pilot structure have been proposed as multiplexing schemes for pilot signals allocated to the same time and frequency resource. A combination of FDM and CDM has also been proposed for standardizing reference signals. For example, pilot signals having equal bandwidth could be separated using CDM while the different bandwidth pilots are separated using distributed FDM.

The CDM type of multiplexing based on usage of cyclic shift provides almost complete orthogonality between different cyclic shifts if the length of cyclic shift is larger than delay spread of the radio channel. For example with an assumption of 5 μs delay spread in the radio channel, 6 orthogonal cyclic shifts inside one short block (SB) can be achieved.

In frequency selective (delay dispersive) channels the cross-correlation properties of CAZAC sequences are not exactly zero, thus in practice the codes often interfere with each other. The orthogonality properties depend on the number of cyclic shifts. Together with power differences the cross-correlation of CAZAC sequences could result in several near/far problems in LTE uplink.

In certain embodiments the pilot sequence can be optimized in terms of intra- and inter-cell orthogonality applicable for extended TTI length, e.g. two sub-frames. According to one embodiment, the pilot sequences are generated as a combination of existing CAZAC codes and Hadamard codes (i.e., block-wise spreading). Each user device may have a dedicated pilot sequence (CAZAC) corresponding to a dedicated frequency pin allocation (FDM multiplexing) and/or a certain cyclic shift of a CAZAC code (CDM multiplexing). Hadamard codes are used to perform the orthogonal spreading for the existing pilot signals. This is done in order to improve the orthogonality (i.e., cross correlation properties) of pilot signals between user devices allocated to the same bandwidth. As a result of this arrangement, "double protection" against the intra/inter-cell interference of the pilot signals can be provided.

In non-synchronized networks the pilot signals are typically designed to be orthogonal within the cell. According to embodiments of the invention, the orthogonality properties between the pilot signals may be improved without any degradation on the properties of the pilot signal.

In synchronized networks, embodiments of the invention may provide an additional degree of freedom to provide inter-cell orthogonality between different cells. The improved inter-cell orthogonality may also be useful in non-synchronized networks.

The following example shows one embodiment of the invention using cyclic-shifted CAZAC codes (CDM approach). This embodiment employs two well known matrices C and W:

$$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$C = \begin{bmatrix} 1.0000 - 0.0000i & 0.8660 - 0.5000i & -0.5000 - 0.8660i & -0.0000 + 1.0000i & -0.5000 - 0.8660i & 0.8660 - 0.5000i \\ 0.8660 - 0.5000i & 1.0000 - 0.0000i & 0.8660 - 0.5000i & -0.5000 - 0.8660i & -0.0000 + 1.0000i & -0.5000 - 0.8660i \\ -0.5000 - 0.8660i & 0.8660 - 0.5000i & 1.0000 - 0.0000i & 0.8660 - 0.5000i & -0.5000 - 0.8660i & -0.0000 + 1.0000i \\ -0.0000 + 1.0000i & -0.5000 - 0.8660i & 0.8660 - 0.5000i & 1.0000 - 0.0000i & 0.8660 - 0.5000i & -0.5000 - 0.8660i \\ -0.5000 - 0.8660i & -0.0000 + 1.0000i & -0.5000 - 0.8660i & 0.8660 - 0.5000i & 1.0000 - 0.0000i & 0.8660 - 0.5000i \\ 0.8660 - 0.5000i & -0.5000 - 0.8660i & -0.0000 + 1.0000i & -0.5000 - 0.8660i & 0.8660 - 0.5000i & 1.0000 - 0.0000i \end{bmatrix}$$

In the above W is the 4×4 Hadamard matrix and C is the matrix including the cyclic shifts of one CAZAC code. Each row of the table above represents a cyclic shift of the CAZAC code as compared to the previous row. The size of the Hadamard matrix is equal to the number of short blocks (SBs) in TTI whereas the size of matrix C is equal to the number of pilot carriers in minimum physical resource block (6 in 180 kHz PRB). In a typical case the number of cyclic shifted CAZAC codes is larger than the number of Walsh codes.

Pilot sequences, e.g., for the nth user device, are spread by multiplying the cyclic shifted CAZAC code by the orthogonal matrix W.:

$$z_{:,n} = C_{:,n} W_{m,:},$$  a.

where n is user device index and m is Walsh code index [1,2,3,4]. This can be done because the number of Walsh codes in matrix W equals the number of SBs in TTI. This is structured in such way that the different Walsh codes are used at least for adjacent cyclic shifted codes. Mathematically speaking this can be realized as:

$$Z^1 = C_{:,1} W_{1,:}$$

$$Z^2 = C_{:,2} W_{2,:}$$

$$Z^3 = C_{:,3} W_{3,:}$$

$$Z^4 = C_{:,4} W_1$$

$$Z^5 = C_{:,5} W_4$$

$$Z^6 = C_{:,6} W_3$$

where the superscript refers to a user device.

The orthogonal matrix W can be generated, for example, by using well known Walsh-Hadamard codes or cyclic GCL (generalized chirp-like) sequences.

Embodiments of the invention may improve the channel estimation since the majority of the inter cell interference of pilot signal is cancelled out using the proposed scheme. The gain depends on the averaging length of the channel estimation filter. Typically, at the receiver site, the channel estimate is averaged over several pilot blocks for improving performance against noise. In one embodiment the averaging length of channel estimation filter is sized according to length of block-level code. In practice suitable averaging length for the channel estimation filter equals to N×length of the block-level code, where, $N=[\frac{1}{2}, 1, 2, 3 \ldots ]$.

The best gain obtained could be in the region of 0-50 km/h. The orthogonality properties between the pilot signals may be improved without any degradation on the properties of the pilot signal.

Figure 2:
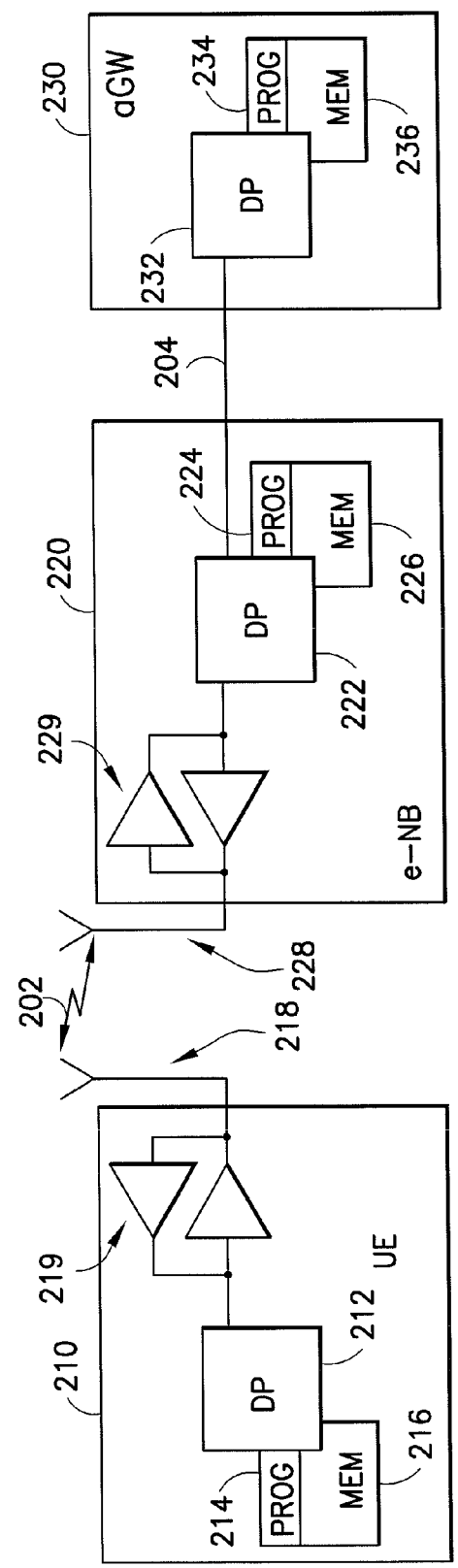
FIG. 2 is a schematic block diagram of user equipments and various network elements that employ aspects of the invention.

FIG. 2 is a schematic diagram showing one user device, referred to below as user equipment (UE) 210 in communication over a wireless link 202 with a network, where the network includes an evolved Node B e-NB 220 and an access gateway aGW 230. The e-NB 220 may be for example a base transceiver station, and the aGW 230 is a higher network entity that controls multiple e-NBs, as a radio network controller controls multiple Node Bs in certain wireless networks. Allocation of the pilot sequences among multiple UEs is determined in the network, by either or both of the eNB 220 and the aGW 230. It is noted that the e-NB 220 allocates resources to multiple UEs 210 within its cell though only one UE 210 is shown, and intra-cell interference can be managed/mitigated according to aspects of this invention by coordinating among e-NBs 220 of adjacent cells, by an aGW 230 that controls those adjacent-cell e-NBs 220, or by some combination of those approaches.

Referring to the user devices above represented as $Z^1$, $Z^2, \ldots Z^6$, assume that $Z^1$ through $Z^3$ are in a first cell and $Z^4$ through $Z^6$ are in a second cell adjacent to the first cell. Note that the same spreading code $W_1$ is allocated to each of $Z^1$ and $Z^4$. Their pilot sequences do not interfere despite being in adjacent cells because the associated CAZAC sequences $C_1$ and $C_4$ are shifted differently. The same applies to $Z^3$ and $Z^6$. Analogously, if two user equipments in adjacent cells used the same shifted CAZAC sequence, their uplink signals would not interfere because those user equipments would be allocated different spreading codes.

The user equipment 210 includes a digital processor 212 for executing computer program instructions 214 (software) that are stored in a local memory 216. Wireless communication from the link 202 is received at and transmitted from one or more antennas 218 coupled to a transceiver 219, which includes a transmitter, a receiver, and a switch or diplex filter or similar switching means between the two. The user equipment receives its dedicated pilot sequences from the network, generated as above. The user equipment 220 then inserts those dedicated pilot signals into the short blocks of sub-frames for an uplink transmission to the network, as detailed above and shown in FIG. 1.

The e-NB 22 also includes a digital processor 222 for executing computer program instructions 224 (software) that are stored in a local memory 226. Wireless communication from the link 202 is received at and transmitted from one or more antennas 228 coupled to a transceiver 229, which includes a transmitter, a receiver, and a switch or diplex filter or similar switching means between the two. The e-NB 220 allocates to each of a plurality of user equipments 210 a spreading code, unique among all allocated spreading codes in the cell. For each user equipment 210, the network allocates a unique combination of spreading sequence and CAZAC code (preferably the CAZAC codes differ only in a cyclic shift) so that each UE's dedicated pilot sequence does not interfere with that of any other user equipment in the same or an adjacent cell. On the uplink, the e-NB 220 receives a message with the dedicated pilot sequence from a particular user equipment 210, and determines characteristics of the channel/link 202 from that received dedicated pilot sequence. The e-NB 220 knows the dedicated pilot sequence in advance because it allocated the spreading code and shifted CAZAC code to the user equipments 210 in its cell, so comparing to the received dedicated pilot sequences gives an indication of channel quality (CQI) to the e-NB 220. The e-NB 220 can also adjust the length of its filter used in estimating the channel based on the length of the block level code.

The aGW 230 includes similar components as the e-NB 220, but is typically not in wireless communication so its link 204 to the e-NB 220 is hardwired, such as a Iub or Iur link. The aGW 230 includes a digital processor 232 for executing computer program instructions 234 (software) that are stored in a local memory 236. Generally, the aGW 230 allocates spreading codes as a block resource to the eNBs 220, and the e-NBs 220 allocate individual spreading codes to individual user equipments 210 in their cell. To ensure a unique combination of spreading code and shifted CAZAC code to each user equipment 210 in any pair of adjacent cells (e.g., different e-NBs 220), some coordination between the involved e-NBs 220 may occur. That coordination may be through the aGW 230 or the aGW 230 may direct an allocation of shifted CAZAC code with a particular spreading code for a particular cell/e-NB 220 to ensure uniqueness over a dedicated pilot signal allocated to another user equipment 210 in an adjacent cell.

Figure 3:
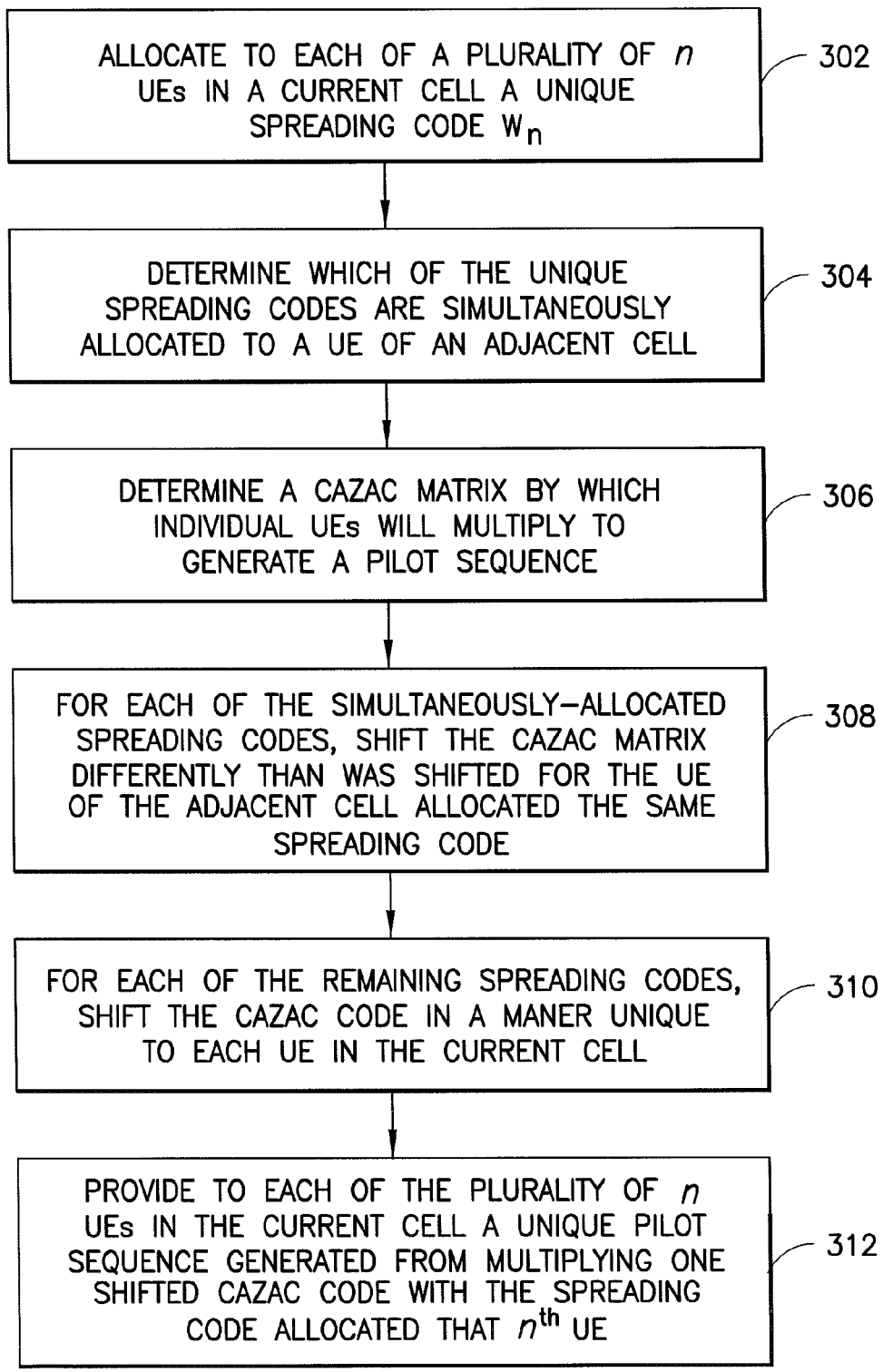
FIG. 3 is a process flow diagram showing steps according to an aspect of the invention.

FIG. 3 shows process steps according to an embodiment. At block 302, the e-NB 220 allocates to each of a plurality of n user equipments a unique spreading code. Whereas each e-NB 220 is responsible for resource allocation within its cell, note that user equipments 210 in adjacent cells may be allocated the same spreading code by their respective e-NBs 220. To resolve/prevent any inter-cell interference, it is determined at block 304 if any user equipments in an adjacent cell are simultaneously allocated a same spreading code as was allocated to a user equipment 210 in the current cell at block 302.

At block 306, it is determined a CAZAC matrix by which individual user equipment, to which a spreading code was allocated at block 302, will use to generate their dedicated pilot sequence. In an embodiment, all the CAZAC matrices are distinguished from one another by cyclic shifting. At block 308, for each of the spreading codes determined at block 304 to be simultaneously allocated in an adjacent cell, a CAZAC matrix for that user equipment in the present cell is shifted/determined so as to ensure that it is not identical to a CAZAC code associated with the user equipment in the adjacent cell using the same spreading code. At block 310, for all other CAZAC codes allocated in the current cell, a CAZAC code is determined so that no two user equipments are associated with the same spreading code and CAZAC code. As seen at block 310, it is advantageous to ensure that all user equipments in the current cell are assigned a uniquely shifted CAZAC code. At block 312, then to each of the n user equipments in the current cell is provided a unique pilot sequence, each unique pilot sequence being the product of the spreading code allocated to the user equipment and the shifted CAZAC code allocated to that same user equipment.

The end result is that no two user equipments, in any pair of adjacent cells, simultaneously are assigned the same spreading code and the same shifted CAZAC code. It can be seen that the decisional processes to arrive at that result are readily implemented in software and executed by the processors described, or in hardware such as an integrated circuit (e.g., an application specific integrated chip (ASIC)).

Figure 4:
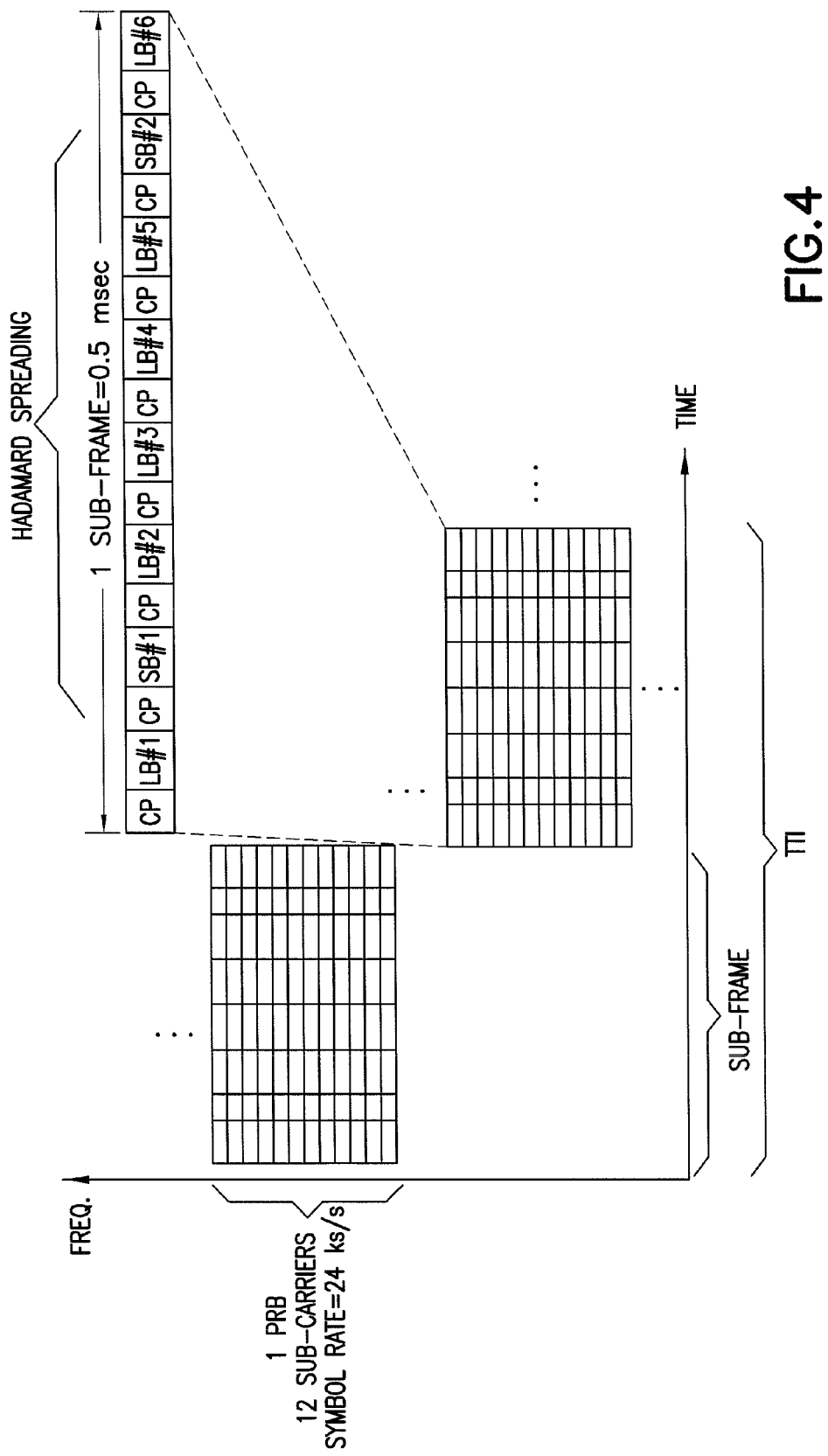
FIG. 4 shows a physical resource block of two sub-frames in further detail.

FIG. 4 shows a specific example of one TTI having a duration of 1.0 ms made from two of the sub-frames shown in FIG. 1. In this non-limiting example some type of spreading scheme is employed, such as but not limited to Hadamard spreading, and is applied for the four middle LBs and the two SBs of the LTE uplink sub-frame. The spreading factor is equal to four in this non-limiting example.

It should be noted, however, that this particular arrangement is just one non-limiting example and that in other exemplary embodiments the spreading can be applied for more or less than four LBs/two SBs. It should be further noted that the Hadamard-type of spreading is possible only with sub-frames (SFs) 2, 4, 8, (power of two), and that different spreading code formats, for example GCL (generalized, chirp-like), can be used for different SF lengths which are not a power of two (e.g., 3 and 6).

FIG. 4 assumes that a single PRB is used for transmitting data associated control information without uplink (UL) data transmission. As shown in this example there are 12 sub-carriers in a single PRB. Thus, this exemplary embodiment, using an allocation of a single PRB, provides four orthogonal resources (corresponding to the four LBs) in a 180 kHz frequency band, each having symbol rate of 24 ks/s (24 thousand symbols per second).

FIG. 4 also assumes that sub-frame based frequency hopping is applied to provide the frequency diversity needed by the control channels (assuming no re-transmissions, low BLER operation point). It should be noted that if the TTI length is made equal to 0.5 ms, then the sub-frame based frequency hopping would preferably not be applied.

Both FDM and CDM can be used to multiplex orthogonal pilot channels. In both cases the maximum number of orthogonal pilot channels is approximately the same. The number of orthogonal pilot channels depends to a large degree on the delay spread of the radio channel. The use of CDM is particularly attractive, as in this approach 6 orthogonal cyclic shifts can be used with SBs.

In lieu of the CMD approach, distributed FDM may also be used to multiplex the pilot channels. However, one potential problem with the use of distributed FDM is that the number of active sub-carriers can become small when the number of multiplexed pilot signals is high. Further, it should be realized that a combination of CDM and FDM may be used to multiplex the orthogonal pilot channels, as noted above.

It can be seen as well in FIG. 4 that there are two simultaneous resources (the SBs) of equal size reserved for data-non-associated control signaling. The resource size is designed in such a way that it is capable of conveying 1-6 bits in this example, a range suitable for some but not all possible combinations (i.e., ACK/NACK, or CQI, or ACK/NACK+CQI) of data-non-associated control signaling as currently defined. As such, the SBs are used herein advantageously for CQI.

The embodiments may be implemented by computer software executable by a data processor of a host device (e.g., e-NB 220 or aGW 230), such as the processors 212, 222, 232, or by hardware, or by a combination of software and hardware. Further in this regard it should be noted that the various blocks of the logic flow diagram of FIG. 3 may represent program steps, or interconnected logic circuits, blocks and functions, or a combination of program steps and logic circuits, blocks and functions.

The memory or memories 216, 226, 236 may be of any type suitable to the local technical environment and may be implemented using any suitable data storage technology, such as semiconductor-based memory devices, magnetic memory devices and systems, optical memory devices and systems, fixed memory and removable memory. The data processor(s) 212, 222, 232 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is noted herein that while the above describes exemplifying embodiments of the invention, there are several variations and modifications which may be made to the disclosed solution without departing from the scope of the invention as defined in the appended claims.

We claim:

1. A method comprising:
   generating, by an apparatus, a dedicated pilot sequence; and
   transmitting, by the apparatus, on an uplink a reference signal comprising applying to the dedicated pilot sequence a combination of cyclic shift and a block spreading code, in which the combination of the cyclic shift and the block spreading code is allocated to the apparatus based on coordination among adjacent cells.

2. The method according to claim 1, in which, at the time of the transmitting, the combination of the cyclic shift and the block spreading code is unique to the apparatus among all user equipment in a cell in which the reference signal is transmitted and in adjacent cells.

3. The method according to claim 1, in which the apparatus comprises a user equipment and generating the dedicated pilot signal comprises the user equipment generating the dedicated pilot signal.

4. The method according to claim 1, in which the apparatus comprises a user equipment and the the combination of the cyclic shift and the block spreading code is allocated to the apparatus with signaling received from a base transceiver station.

5. An apparatus comprising:
   a memory storing computer program instructions; and
   a processor;
   in which the memory with the computer program instructions is configured with the processor to cause the apparatus to:
   generate a dedicated pilot sequence; and
   transmit on an uplink a reference signal comprising applying to the dedicated pilot sequence a combination of a cyclic shift and a block spreading code, in which the combination of the cyclic shift and the block spreading code is allocated to the apparatus based on coordination among adjacent cells.

6. The apparatus according to claim 5, in which, at the time the reference signal is transmitted uplink, the combination of the cyclic shift and the block spreading code is unique to the apparatus among all user equipment in a cell in which the reference signal is transmitted and in adjacent cells.

7. The apparatus according to claim 5, in which the apparatus comprises a user equipment.

8. The apparatus according to claim 5, in which the combination of the cyclic shift and the block spreading code is allocated to the apparatus by a signaling received from a base transceiver station, and in which the memory with the computer program instructions is configured with the processor to cause the apparatus to generate the dedicated pilot signal from the signaling received from the base transceiver station.

9. A non-transitory memory storing computer program instructions which, when executed by at least one processor, result in actions comprising:
   generating a dedicated pilot sequence; and
   transmitting on an uplink a reference signal comprising applying to the dedicated pilot sequence a combination of a cyclic shift and a block spreading code, in which the combination of the cyclic shift and the block spreading code is allocated to the apparatus based on coordination among adjacent cells.

10. The non-transitory memory according to claim 9, in which the memory and the processor are disposed in a user equipment; and at the time of the transmitting, the combination of the cyclic shift and the block spreading code is unique to the user equipment among all user equipment in a cell in which the reference signal is transmitted and in adjacent cells.

11. The non-transitory memory according to claim 9, in which the memory and the processor are disposed in a user equipment which generates the reference signal.

12. The non-transitory memory according to claim 9, in which the memory and the processor are disposed in a user equipment and in which the combination of the cyclic shift and the block spreading code is allocated to the user equipment with signaling received from a base transceiver station.

13. A method comprising:
coordinating among adjacent cells to achieve for each of a plurality of user equipment a unique combination of cyclic shift and block spreading code; and
allocating to each of the plurality of user equipment which are operating in at least one of the adjacent cells a different one of the unique combinations of cyclic shift and block spreading code for reference signal transmissions.

14. The method according to claim 13, in which the method is executed by at least one of a base transceiver station and an access gateway.

15. The method according to claim 14, further comprising:
for each of the reference signal transmissions that are received at the base transceiver station, estimating a corresponding channel using an averaging length that depends on a length of the corresponding block spreading code.

16. An apparatus comprising:
a memory storing computer program instructions; and
a processor;
in which the memory with the computer program instructions is configured with the processor to cause the apparatus to:
coordinate among adjacent cells to achieve for each of a plurality of user equipment a unique combination of cyclic shift and block spreading code; and
allocate to each of the plurality of user equipment which are operating in at least one of the adjacent cells a different one of the unique combinations of cyclic shift and block spreading code for reference signal transmissions.

17. The apparatus according to claim 16, in which the apparatus comprises a base transceiver station or an access gateway.

18. The apparatus according to claim 17, in which the memory with the computer program instructions is configured with the processor to cause the apparatus further to:
for each of the reference signal transmissions that are received at the base transceiver station, estimate a corresponding channel using an averaging length that depends on a length of the corresponding block spreading code.

19. A non-transitory memory storing computer program instructions which, when executed by at least one processor, result in actions comprising:
coordinating among adjacent cells to achieve for each of a plurality of user equipment a unique combination of cyclic shift and block spreading code; and
allocating to each of the plurality of user equipment which are operating in at least one of the adjacent cells a different one of the unique combinations of cyclic shift and block spreading code for reference signal transmissions.

20. The memory according to claim 19, in which the memory and the processor are disposed within a base transceiver station or an access gateway.

21. The memory according to claim 20, the actions further comprising:
for each of the reference signal transmissions that are received at the base transceiver station, estimating a corresponding channel using an averaging length that depends on a length of the corresponding block spreading code.

22. An apparatus comprising:
a memory storing computer program instructions; and
a processor;
in which the memory with the computer program instructions is configured with the processor to cause the apparatus to:
provide each of a plurality of a user equipment in a communication system with a dedicated pilot sequence for reference signal transmission that is based on a block spreading method;
coordinate among adjacent cells such that each user equipment is allocated a unique combination of shifted dedicated pilot sequence and block spreading code; and
receive from at least some of the plurality of user equipment transmissions using the block spreading method and comprising the provided pilot sequences.

23. The apparatus according to claim 22, in which orthogonal codes are used in the block spreading method.

24. The apparatus according to claim 22, wherein the pilot sequences in at least some of the received transmissions are spread over one uplink transmission interval comprising four short blocks.

25. The apparatus according to claim 24, wherein the uplink transmission interval during which at least some of the transmissions are received comprises two sub-frames.

26. An apparatus comprising:
a memory storing computer program instructions; and
a processor;
in which the memory with the computer program instructions is configured with the processor to cause the apparatus to:
spread a dedicated pilot sequence in an uplink reference signal transmission using a block spreading method; wherein a different combination of shifted dedicated pilot sequence and block spreading code is used in the apparatus than is used by any other user equipment in any adjacent cell.

27. The apparatus according to claim 26, wherein the block spreading method comprises spreading the pilot sequence using an orthogonal code.

* * * * *